(12) United States Patent
Torres et al.

(10) Patent No.: US 6,215,078 B1
(45) Date of Patent: Apr. 10, 2001

(54) METHOD AND APPARATUS FOR DETERMINING A STABLE WEIGHT MEASUREMENT FOR USE IN A SECURITY SOFTWARE APPLICATION OF A SELF-SERVICE CHECKOUT TERMINAL

(75) Inventors: Rafael E. Torres, Kennesaw; Dusty L. Lutz, Lawrenceville, both of GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/218,232

(22) Filed: Dec. 22, 1998

(51) Int. Cl.[7] .................. G01G 19/40; G01G 19/413; G06K 7/01
(52) U.S. Cl. .................. 177/25.15; 702/101; 705/414; 705/415; 235/383
(58) Field of Search .................. 702/101, 102, 702/173; 73/1.13; 177/50, 25.13, 25.15; 705/414, 415; 235/383; 181/61

(56) References Cited

U.S. PATENT DOCUMENTS

| 4,347,903 | * | 9/1982 | Yano et al. ............... 177/25.13 |
| 4,412,298 | * | 10/1983 | Feinland et al. .......... 702/102 |
| 4,660,160 | * | 4/1987 | Tajima et al. ............ 702/173 |
| 4,715,457 | * | 12/1987 | Amacher et al. .......... 177/50 |
| 4,779,706 | * | 10/1988 | Mergenthaler ............ 177/50 |
| 4,787,467 | * | 11/1988 | Johnson .................. 177/50 |
| 4,792,018 | * | 12/1988 | Humble et al. ........... 177/50 |
| 5,123,494 | * | 6/1992 | Schneider ................ 177/50 |
| 5,125,465 | * | 6/1992 | Schneider ................ 177/50 |
| 5,230,391 | * | 7/1993 | Murata et al. ............ 177/50 |
| 5,488,202 | * | 1/1996 | Baitz et al. .............. 177/25.15 |
| 5,952,642 | * | 9/1999 | Lutz ...................... 235/383 |
| 5,967,264 | * | 10/1999 | Lutz et al. ............... 186/61 |
| 6,080,938 | * | 6/2000 | Lutz ...................... 177/25.15 |

* cited by examiner

Primary Examiner—Randy W. Gibson
(74) Attorney, Agent, or Firm—Maginot, Addison & Moore

(57) ABSTRACT

A method of operating a retail terminal having a weight scale associated therewith includes the step of executing a security software application so as to provide security to the retail terminal during operation thereof. The method also includes the step of determining a current weight value associated with output from the weight scale. Moreover, the method includes the step of comparing the current weight value to a previous-stable-weight value and generating a weight change control signal if the current weight value is not within a predetermined tolerance range of the previous-stable-weight value. Yet further, the method includes the step of utilizing the current weight value during execution of the security software application in response to generation of the weight change control signal. A retail checkout terminal is also disclosed.

14 Claims, 7 Drawing Sheets

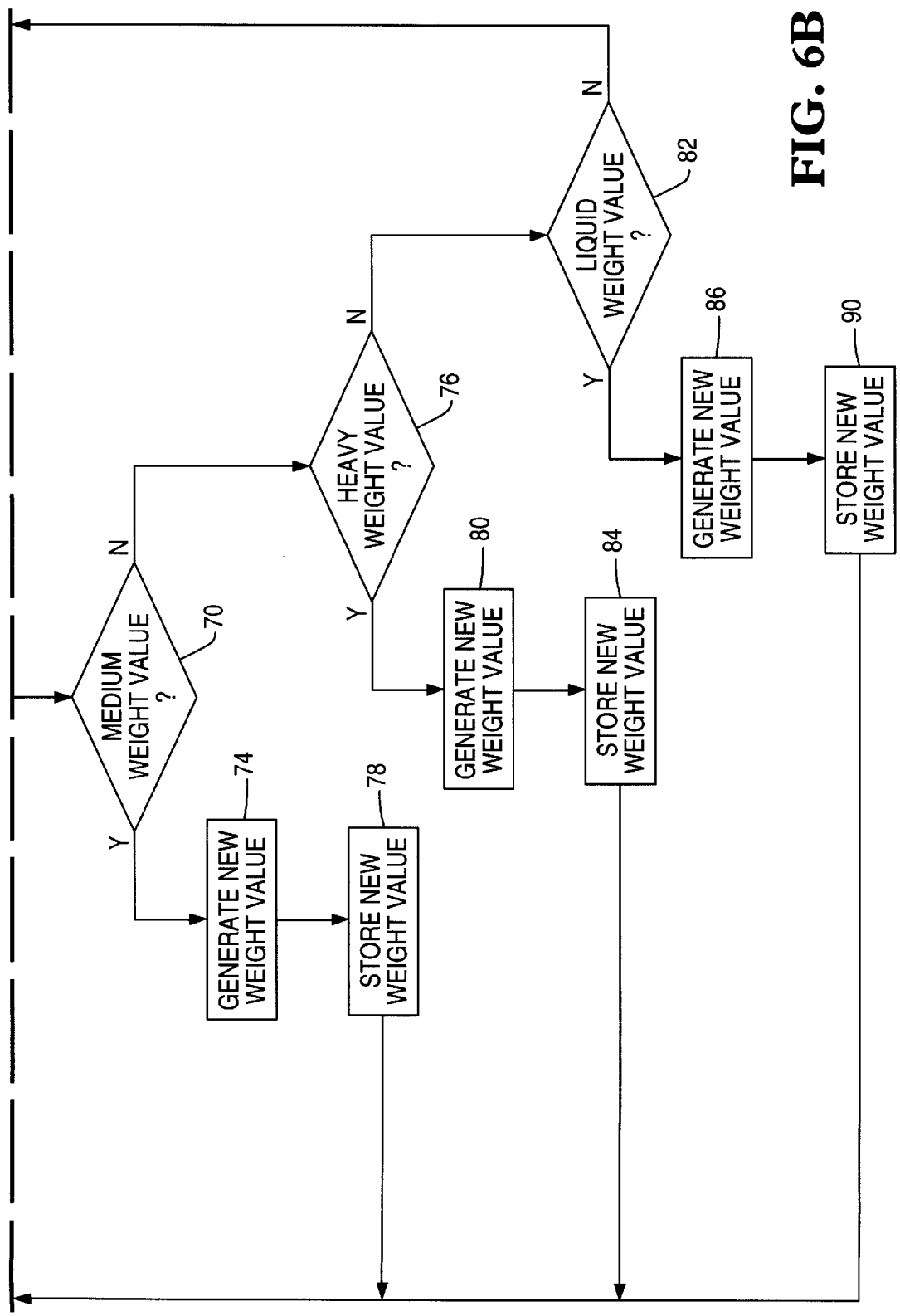

METHOD AND APPARATUS FOR DETERMINING A STABLE WEIGHT MEASUREMENT FOR USE IN A SECURITY SOFTWARE APPLICATION OF A SELF-SERVICE CHECKOUT TERMINAL

TECHNICAL FIELD OF THE INVENTION

The present invention relates generally to a retail checkout terminal, and more particularly to a method and apparatus for determining a stable weight measurement for use in a security software application of a self-service checkout terminal.

BACKGROUND OF THE INVENTION

In the retail industry, the largest expenditures are typically the cost of the goods sold followed closely by the cost of labor expended. With particular regard to the retail grocery or supermarket industry, the impetus to reduce labor costs has focused on reducing or eliminating the amount of time required to handle and/or process the items or goods to be purchased by a customer. To this end, there have been a number of self-service checkout terminal concepts developed which attempt to substantially eliminate the need for a checkout clerk.

A self-service checkout terminal is a system which is operated by a customer without the aid of a checkout clerk. In such a system, the customer scans individual items for purchase across a scanner and then places the scanned item into a grocery bag, if desired. The customer then pays for his or her purchase either at the self-service checkout terminal if so equipped, or at a central payment area which is staffed by a store employee. Thus, a self-service checkout terminal permits a customer to select, itemize, and in some cases pay for his or her purchase without the assistance of the retailers personnel.

A customer typically has little or no training in the operation of a self-service checkout terminal prior to his or her initial use of the checkout terminal. One concern that retailers have when evaluating a self-service checkout terminal is the level of supervision provided to inexperienced customers. Moreover, it is also known that some customers may have improper intentions when using a self-service checkout terminal. In traditional checkout systems, the clerk employed by the retailer to operate the checkout terminal provides a level of security against theft or other improprieties. However, in the case of a self-service checkout terminal, the terminal itself must provide the necessary security. Such security includes preventing a customer from either inadvertently or intentionally placing an item in a grocery container such as a grocery bag without scanning the item, or voiding one item from entry, but removing a second item of lesser value, or no item at all, from the grocery bag. Thus, another concern when evaluating a self-service checkout terminal is the level of security provided against illicit use of the self-service checkout terminal by customers.

Therefore, self-service checkout terminals have heretofore been designed with security systems which monitor operation of the self-service checkout terminal. For example, weight scales have been incorporated into self-service checkout terminals to monitor the manner in which a customer handles or otherwise processes items during operation of the self-service checkout terminal. In particular, self-service checkout terminals have heretofore been designed with a weight scale positioned so as to detect placement of items in or removal of items from a bagging area associated with the self-service checkout terminal (including a number of shelves around the bagging area).

In such security systems, a security software application is executed by a processing unit associated with the self-service checkout terminal in order to analyze or otherwise process output from the weight scale and the other terminal components of the security system. It is imperative that the security software application is provided with timely, accurate, stable weight values from the weight scale in order to properly determine when a security breach has occurred. Weight scales which are commonly used in retail applications are relatively sensitive to weight changes, and therefore can sometimes generate output signals indicative of weight changes when in fact no items have been placed in or removed from the bagging area. In particular, most modern, commercially available retail weight scales include a controller which can calculate and thereafter output weight values in a relatively short period of time (e.g. typically measured in milliseconds). Such fast weight value generation may undesirably produce "false alarms" if reported directly to the security software application of the self-service checkout terminal. In particular, many environmental conditions present in a retail store may lead to an increase or decrease in the measured weight value of the items in the bagging area without an item actually being placed in or removed from the bagging area. For example, if a customer bumps into the self-service checkout terminal, the weight scale may actually register a weight change which could cause the security software application to falsely conclude that a security breach has occurred. Moreover, it is known that the cycling of the retail store's air conditioning system can cause changes in the measured weight of the items in the bagging area if the self-service checkout terminal is positioned in a certain location relative to outlets associated with the air conditioning system.

Moreover, items containing liquids (e.g. milk and bleach) typically produce varying weight values when initially placed in the bagging area due to sloshing of the liquid within the bottle. If such varying weight values are utilized by the security software application, false alarms regarding security breaches may also be generated.

What is needed therefore is an apparatus and method for operating a self-service checkout terminal which overcomes one or more of the above-mentioned drawbacks. What is particularly needed is a method and apparatus which provides timely, accurate, stable weights for use by a security software application associated with a self-service checkout terminal.

SUMMARY OF THE INVENTION

In accordance with a first embodiment of the present invention, there is provided a method of operating a retail terminal having a weight scale associated therewith. The method includes the step of determining a current weight value associated with output from the weight scale. The method also includes the step of comparing the current weight value to a previous-stable-weight value and generating a weight change control signal if the current weight value is not within a predetermined tolerance range of the previous-stable-weight value. Moreover, the method includes the step of replacing the previous-stable-weight value with the current weight value in a memory device associated with the retail terminal in response to generation of the weight change control signal.

In accordance with a second embodiment of the present invention, there is provided a retail terminal. The retail terminal includes a weight scale. The retail terminal also includes a processing unit electrically coupled to the weight scale. Moreover, the retail terminal includes a memory device electrically coupled to the processing unit. The memory device has stored therein a plurality of instructions which, when executed by the processing unit, causes the processing unit to (a) determine a current weight value associated with output from the weight scale, (b) compare the current weight value to a previous-stable-weight value stored in the memory device and generate a weight change control signal if the current weight value is not within a predetermined tolerance range of the previous-stable-weight value, and (c) replace the previous-stable-weight value with the current weight value in the memory device in response to generation of the weight change control signal.

In accordance with a third embodiment of the present invention, there is provided a method of operating a retail terminal having a weight scale associated therewith. The method includes the step of executing a security software application so as to provide security to the retail terminal during operation thereof. The method also includes the step of determining a current weight value associated with output from the weight scale. Moreover, the method includes the step of comparing the current weight value to a previous-stable-weight value and generating a weight change control signal if the current weight value is not within a predetermined tolerance range of the previous-stable-weight value. Yet further, the method includes the step of utilizing the current weight value during execution of the security software application in response to generation of the weight change control signal.

It is therefore an object of the present invention to provide a new and useful method and apparatus of operating a retail checkout terminal.

It is moreover an object of the present invention to provide an improved method and apparatus for operating a retail checkout terminal.

It is yet further an object of the present invention to provide a method and apparatus for operating a retail checkout terminal which provides stable weight measurements for use by a security software application associated with the retail checkout terminal.

The above and other objects, features, and advantages of the present invention will become apparent from the following description and the attached drawings.

DETAILED DESCRIPTION OF THE INVENTION

Figure 1:
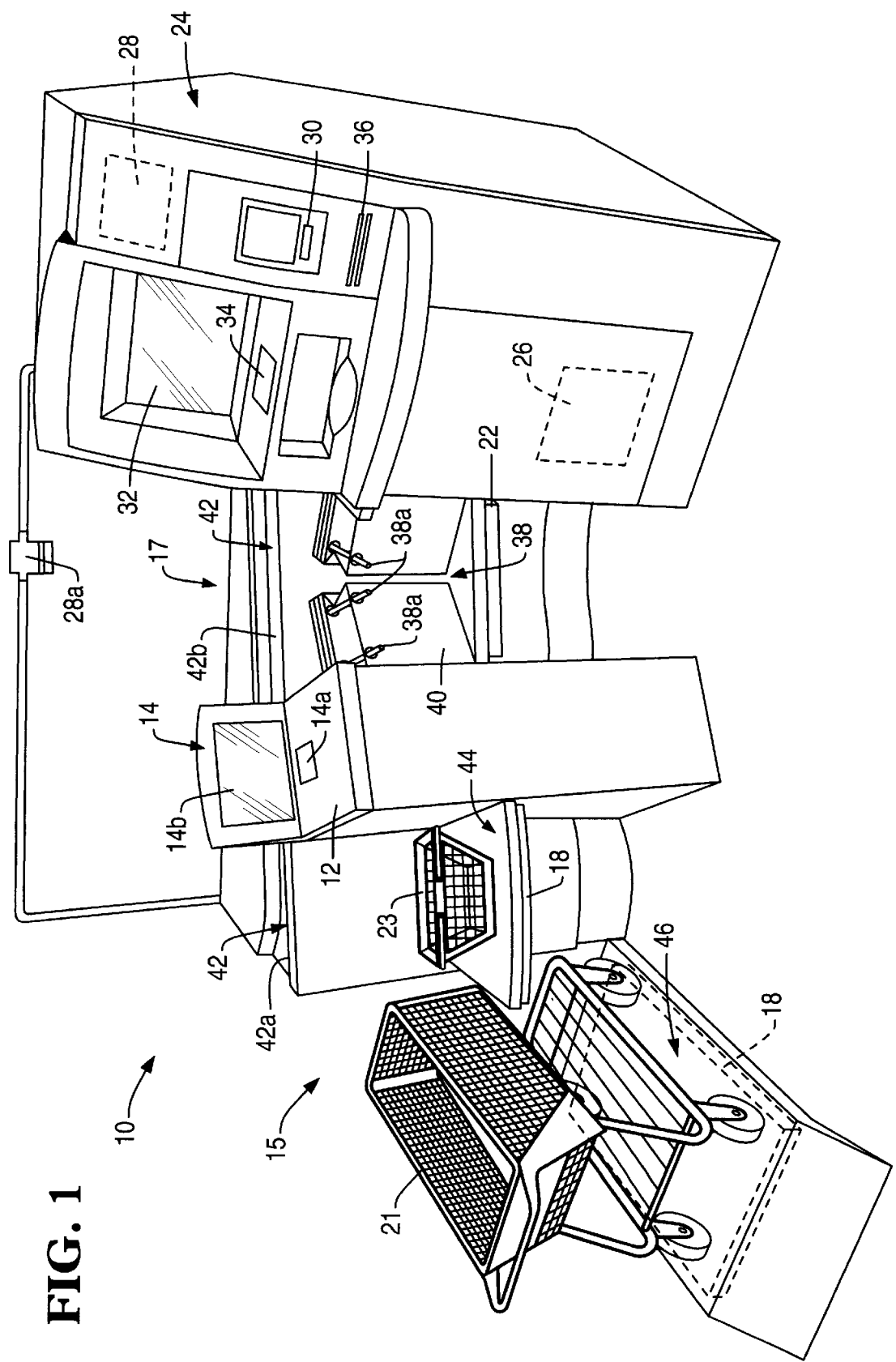
FIG. 1 is a perspective view of a self-service checkout terminal which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
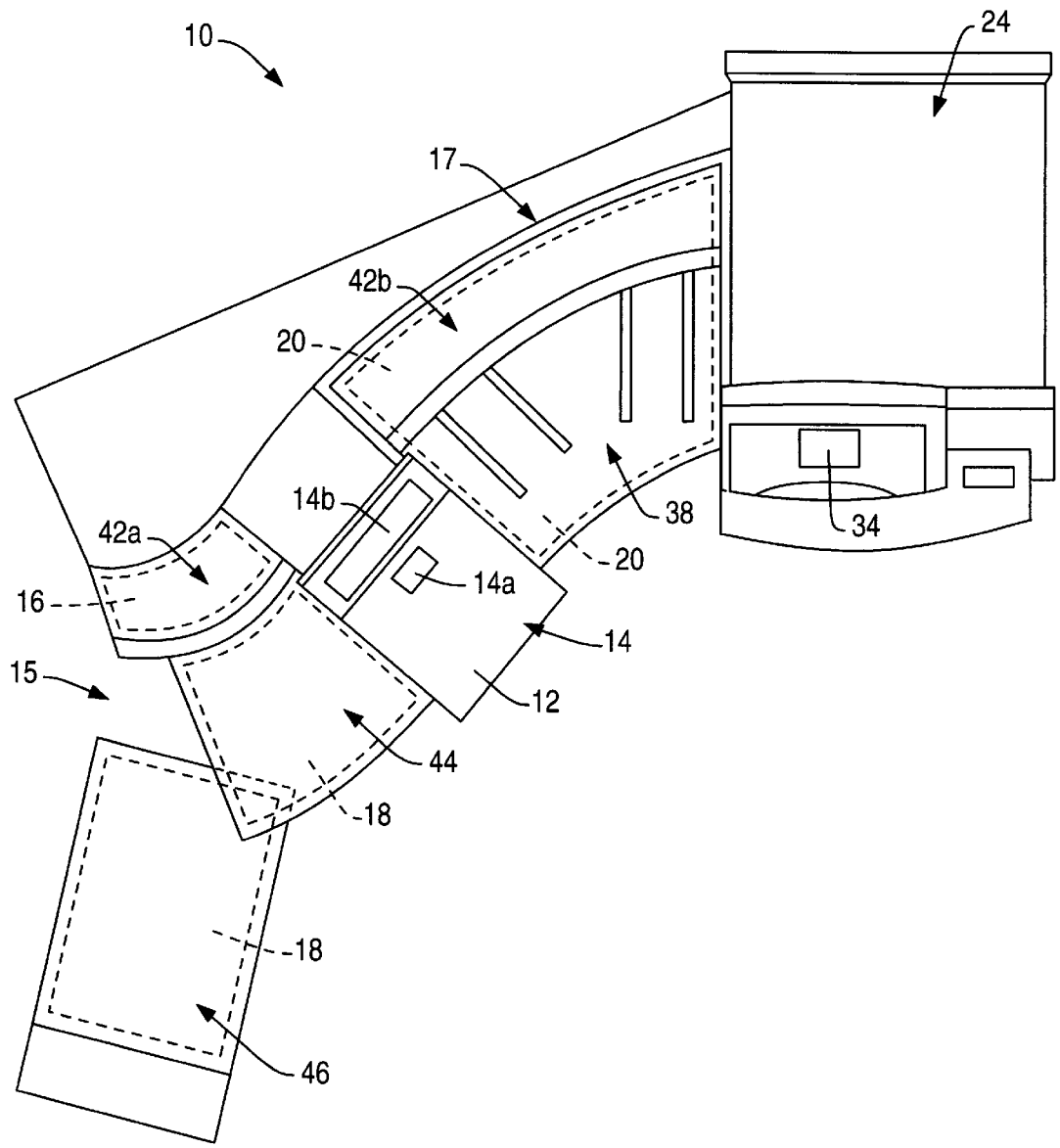
FIG. 2 is a plan view of the self-service checkout terminal of FIG. 1.

Referring now to FIGS. 1 and 2, there is shown a self-service checkout terminal 10 for use in a retail business such as a grocery store. For purposes of the following discussion, the self-service checkout terminal 10 will be described in detail; however, it should be appreciated that an assisted checkout terminal (i.e. a retail checkout terminal which is operated by a store employee such as a checkout clerk) may be configured in a similar manner. The self-service checkout terminal 10 includes a product scale 12, a scanner 14, a post-scan or bagging scale 20, an automated teller machine (ATM) 24, and a processing unit 26. The ATM 24 includes a video system 28, a card reader 30, a display monitor 32, a data input device 34, and a printer 36. As shall be discussed below in more detail, the self-service checkout terminal 10 may alternatively also be equipped with a pre-scan shelf scale 16 and a cart/basket scale 18.

The self-service checkout terminal 10 also includes a bagwell 38 for accommodating one or more grocery containers or bags 40, a counter 42, and a basket shelf 44. The counter 42 defines an arcuate surface as shown in FIG. 2. Such an arcuate surface allows the counter 42 to be positioned relatively close to both the scanner 14 and the bagwell 38 thereby permitting the counter 42 to function as a "set-aside surface" for use by the user during operation of the self-service checkout terminal 10. Such set-aside surfaces are necessary to allow the user to selectively choose the order in which items are scanned or otherwise entered. Moreover, such set-aside surfaces are necessary to allow a user to selectively choose the order in which items are loaded into the grocery bags 40. For example, if the user scanned a loaf of bread, the user may wait to load the bread into the grocery bag 40 until the bag is nearly full thereby preventing the bread from being crushed. As alluded to above, it may be desirable to use the set-aside surfaces both before and after an item has been scanned or otherwise entered. Hence, as shown in FIG. 2, the scanner 14 divides the counter 42 into a pre-scan set-aside shelf 42a, and a post-scan set-aside shelf 42b. In particular, the scanner 14 divides the counter 42 into the pre-scan set-aside shelf 42a which is upstream of the scanner 14, and the post-scan set-aside shelf 42b which is downstream from the scanner 14. The terms "upstream" and "downstream" are used to be consistent with the flow of items through the self-service checkout terminal 10 during a typical checkout procedure. In particular, an item enters at the area proximate the pre-scan set-aside shelf 42a then flows in a downstream direction to be scanned at the scanner 14 so as to enter a product code associated with the item. Once the product code associated with the item is entered, the item flows from the scanner 14 in a downstream direction to the post-scan set-aside shelf 42b or the bagwell 38.

The bagwell 38 is disposed between the scanner 14 and the ATM 24 as shown in FIG. 1. The bagwell 38 includes a number of posts 38a which cooperate to support a number of the grocery bags 40. The bagwell 38 is configured to allow two or more grocery bags 40 to be accessed by the user at any given time. In particular, the posts 38a are of a sufficient length to secure a number of unopened grocery bags 40 along with two or more opened grocery bags 40 thereby allowing a user to selectively load various item types into the grocery bags 40. For example, the user may desire to use a first grocery bag 40 for household chemical items such as soap or bleach, and a second grocery bag 40 for edible items such as meat and produce.

The scanner 14 conventionally scans or reads a product identification code such as a Universal Product Code (UPC), industrial symbol(s), alphanumeric character(s), or other indicia associated with an item to be purchased. One scanner which may be used in the present invention is a model number 7875 bi-optic scanner which is commercially available from NCR Corporation of Dayton, Ohio.

The scanner 14 includes a first scanning window 14a and a second scanning window 14b. The first scanning window 14a is disposed in a substantially horizontal manner, whereas the second scanning window 14b is disposed in a substantially vertical manner, as shown in FIG. 1. The product scale 12 is integrated with the scanner 14. More specifically, the product scale 12 is disposed substantially parallel to the scanning window 14a thereby enveloping the scanning window 14a. If an item such as produce is placed upon the product scale 12 or the first scanning window 14a, the product scale 12 may be used to determine the weight of the item.

The scanner 14 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner 14, the scanning light beams scatter off the code and are returned to the scanner 14 where they are collected and detected. The reflected light is then analyzed electronically in order to determine whether the reflected light contains a valid product identification code pattern. If a valid code pattern is present, the product identification code is then converted into pricing information which is then used to determine the cost of the item in a known manner.

If utilized, the pre-scan shelf scale 16 is positioned in order to determine the weight of an item or items positioned on the pre-scan shelf 42a. In particular, if a user removes an item from the pre-scan shelf 42a in order to scan or otherwise enter the item into the self-service checkout terminal 10, the pre-scan shelf scale 16 may be used to determine the weight of the item by detecting a weight decrease associated with removal of the item from the pre-scan shelf 42a. Moreover, the pre-scan shelf 42a functions as a "return area" of the self-service checkout terminal 10. More specifically, if the user voids an item from entry during the checkout procedure, the user is instructed via a message displayed on the display monitor 32 to position the voided item on the pre-scan shelf 42a. Hence, the pre-scan shelf scale 16 may be used to determine the weight associated with the voided item by detecting a weight increase associated with placement of the voided item on the pre-scan shelf 42a.

Moreover, if utilized, the cart/basket scale 18 is positioned in order to determine the weight of an item or items positioned in either (1) a grocery cart 21 positioned on a cart unloading platform 46, and/or (2) a grocery hand basket 23 positioned on the basket shelf 44. In particular, if a user removes an item from either the grocery cart 21 or the grocery hand basket 23 in order to scan or otherwise enter the item into the self-service checkout terminal 10, the cart/basket scale 18 may be used to determine the weight of the item by detecting a weight decrease associated with removal of the item from either the grocery cart 21 or the grocery hand basket 23, respectively. It should be appreciated that the cart/basket scale 18 may be embodied as two separate scales (i.e. a first scale for detecting weight changes on the cart unloading platform 46, and second scale for detecting weight changes on the basket shelf 44), or may preferably be embodied as a single, integrated weight scale which is mechanically coupled to both the cart unloading platform 46 and the basket shelf 44.

From the above discussion, it should be appreciated that the pre-scan shelf scale 16 and the cart/basket scale 18 cooperate to monitor placement of items into, and removal of items from, a pre-scan area 15 associated with the self-service checkout terminal 10. What is meant herein by the term "pre-scan area" is the area associated with the self-service checkout terminal 10 in which items may be placed prior to being scanned or otherwise entered into the self-service checkout terminal 10. For example, the pre-scan area 15 includes the pre-scan shelf 42a, the cart unloading platform 46, and the basket shelf 44.

The post-scan scale 20 is positioned in order to determine the weight of an item or items positioned (1) on the post-scan shelf 42b, and/or (2) in the bagwell 38 (i.e. in one of the grocery bags 40). In particular, if a user places an item on the post-scan shelf 42b or into one of the grocery bags 40, the post-scan scale 20 may be used to determine the weight of the item by detecting a weight increase associated with placement of the item on the post-scan shelf 42b or into one of the grocery bags 40. Alternatively, if a user removes an item from the post-scan shelf 42b or one of the grocery bags 40, the post-scan scale 20 may be used to determine the weight of the item by detecting a weight decrease associated with removal of the item from the post-scan shelf 42b or one of the grocery bags 40. The post-scan scale may be embodied as any known retail weight scale. One such retail weight scale which is particularly useful as the post-scan scale 20 of the present invention is a model number 6680 weight scale which is commercially available from Weigh-Tronix, Incorporated of Santa Rosa, Calif.

From the above discussion, it should be appreciated that the post-scan scale 20 monitors placement of items into, and removal of items from, a post-scan area 17 associated with the self-service checkout terminal 10. What is meant herein by the term "post-scan area" is the area associated with the self-service checkout terminal 10 in which items may be placed subsequent to being scanned or otherwise entered into the self-service checkout terminal 10. For example, the post-scan area 17 includes the post-scan shelf 42b and the bagwell 38 (including the grocery bags 40 therein).

It should be further appreciated that the post-scan scale 20 may be used to monitor movement or shuffling of items within the post-scan area 17. In particular, the post-scan scale 20 may be used to monitor movement of items onto and off of a number of post-scan surfaces within the post-scan area 17. What is meant herein by the term "post-scan surface" is any surface within the post-scan area on which an item may be positioned after being scanned or otherwise entered into the self-surface checkout terminal 10. An example of a post-scan surface would include the post-scan shelf 42b and the base of the bagwell 38 on which the grocery bags 40 are positioned. Hence, the post-scan scale 20 may be used to monitor movement of items which had been previously set-aside on the post-scan shelf 42b and thereafter either placed into one of the grocery bags 40 or removed permanently from the self-service checkout terminal 10 (e.g. placed in the user's pocket). For instance, the post-scan scale 20 may be used to first determine that an item has been removed from the post-scan shelf 42b by detecting a weight decrease associated with removal of the item. Thereafter, the post-scan scale 20 may be used to determine if the item is then placed into one of the grocery bags 40 by detecting a weight increase associated with placement of the item into one of the grocery bags 40.

The processing unit 26 executes a security software application 22 (see FIG. 4) in order to provide security during operation of the self-service checkout terminal 10. In particular, the security software application 22 utilizes weight values generated by the post-scan scale 20 in order to determine if the movement of items within the post-scan area 17 represent a security breach. For example, the processing unit 26 utilizes the security software application 22 to determine if an item has been placed in the post-scan area 17 without having first been scanned or otherwise entered into the self-service checkout terminal 10. As a further example, the processing unit 26 utilizes the security software application 22 to determine if a user voids a first item and then removes a second, different item from the post-scan area 17. Yet further, the processing unit 26 utilizes the security software application 22 to track movement of items within the post-scan area 17 such as movement of items between the post-scan shelf 42b and the grocery bags 40.

Figure 4:
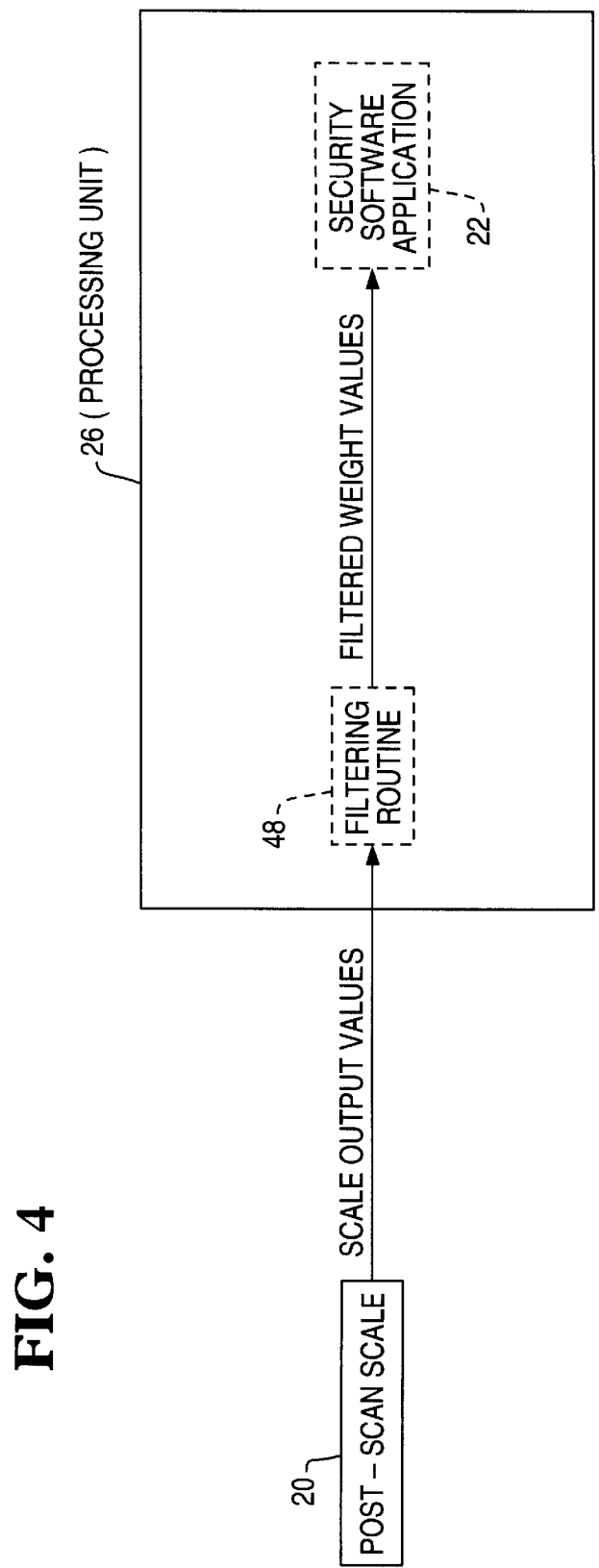
FIG. 4 is a simplified block diagram which shows a data path for generating valid, stable weights according to the present invention.

In order to provide valid, stable weights for use by the security software application 22, the processing unit 26 "filters" the output of the post-scan scale 20 prior to presentation thereof to the security software application 22. In particular, as shown in FIG. 4, the processing unit 26 executes a filtering routine 48 which produces valid, stable weight values from the numerous weight values generated by the post-scan scale 20 and thereafter outputs such valid, stable weight values to the security software application 22. Such filtering of weight values includes the disregarding of the measured weight values associated with weight changes due to environmental conditions. For example, if a user bumps into the self-service checkout terminal 10, the post-scan scale 20 may actually detect or otherwise register a weight change which could cause the security software application 22 to falsely conclude that a security breach has occurred. However, the measured weight values associated with such a weight change are filtered out by the filtering routine 48 thereby preventing such an erroneous conclusion that a security breach has occurred. Moreover, cycling of the retail store's air conditioning system may cause the post-scan scale 20 to register measured weight values indicative of a weight change which could cause the security software application 22 to falsely conclude that a security breach has occurred. As with before, the measured weight values associated with such an erroneous weight change is filtered out by the filtering routine 48. Moreover, items containing liquids (e.g. milk and bleach) typically produce varying measured weight values when initially placed on the post-scan scale 20 due to sloshing of the liquid within the bottle. Such varying measured weight values are filtered by the filtering routine 48 so as to produce a valid, stable weight for use by the security software application 22. The filtering routine 48 will be discussed below in more detail in regard to FIG. 6.

The display monitor 32 displays instructions which serve to guide a user through a checkout procedure. For example, an instruction is displayed on the display monitor 32 which instructs the user to remove an item from the grocery cart 21 and enter the item into the self-service checkout terminal 10 by (1) passing the item over the scanner 14, or (2) placing the item on the product scale 12 in order to obtain the weight of the item. The display monitor 32 may be a known touch screen monitor which can generate data signals when certain areas of the screen are touched by a user.

Figure 3:
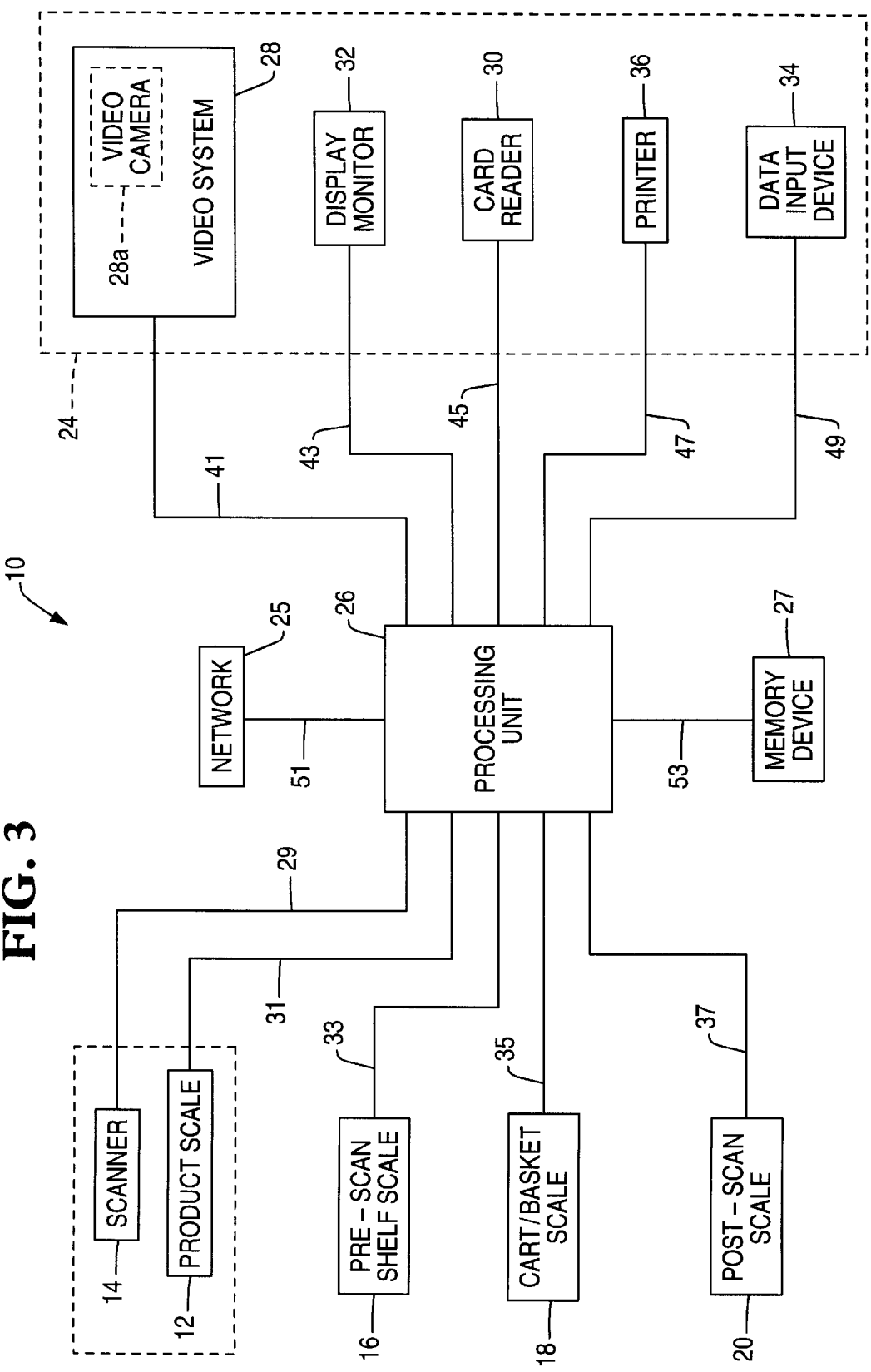
FIG. 3 is a simplified block diagram of the self-service checkout terminal of FIG. 1.

Referring now to FIG. 3, there is shown a simplified block diagram of the self-service checkout terminal 10. The processing unit 26 is electrically coupled to the product scale 12, the scanner 14, the pre-scan shelf scale 16 (if so equipped), the cart/basket scale 18 (if so equipped), the post-scan scale 20, the video system 28, the card reader 30, the display monitor 32, the data input device 34, and the printer 36. The processing unit 26 is also electrically coupled to a network 25 and a memory device 27 as shown in FIG. 3.

The processing unit 26 monitors output signals generated by the scanner 14 via a communication line 29. In particular, when the user of the self-service checkout terminal 10 scans an item which includes a bar code across the scanning windows 14a, 14b, an output signal is generated on the communication line 29.

The processing unit 26 is coupled to the product scale 12 via a data communication line 31. In particular, when an item is placed on the product scale 12, the product scale 12 generates an output signal on the data communication line 31 indicative of the weight of the item.

If the self-service checkout terminal 10 is equipped with the pre-scan shelf 16, the processing unit 26 communicates with the pre-scan shelf scale 16 via a data communication line 33. In particular, when an item is placed on the pre-scan shelf 42a, the pre-scan shelf scale 16 generates an output signal on the data communication line 33 indicative of the weight of the item. Similarly, when an item is removed from the pre-scan shelf 42a, the pre-scan shelf scale 16 generates an output signal on the data communication line 33 indicative of the weight of the removed item.

Similarly, if the self-service checkout terminal 10 is equipped with the cart/basket scale 18, the processing unit 26 communicates with the cart/basket scale 18 via a data communication line 35. In particular, when an item is removed from either the grocery cart 21 or the grocery hand basket 23, the cart/basket scale 18 generates an output signal on the data communication line 35 indicative of the weight of the removed item.

The processing unit 26 is coupled to the post-scan scale 20 via a data communication line 37. In particular, when an item is placed on the post-scan shelf 42b or into one of the grocery bags 40, the post-scan scale 20 generates an output signal on the data communication line 37 indicative of the weight of the item. Similarly, when an item is removed from the post-scan shelf 42b or one of the grocery bags 40, the post-scan scale 20 generates an output signal on the data communication line 37 indicative of the weight of the removed item. As discussed above, such output signals from the post-scan scale 20 are filtered by the filtering routine 48 executed by the processing unit 26 prior to being utilized by the security software application 22 (see FIG. 4).

The processing unit 26 communicates with the video system 28 via a communication line 41. The video system 28 includes a video camera 28a (see also FIG. 1), and is included in the self-service checkout terminal 10 to enhance the security thereof. The video system 28 may be a known closed-circuit video system which displays video images on a portion of the display monitor 32 relating to certain events during a user's transaction.

The processing unit 26 communicates with the display monitor 32 through a data communication line 43. The processing unit 26 generates output signals on the data communication line 43 which cause various instructional messages to be displayed on the display monitor 32. The display monitor 32 may include known touch screen technology which can generate output signals when the user touches a particular area of the display screen associated with the display monitor 32. The signals generated by the display monitor 32 are transmitted to the processing unit 26 via the data communication line 43. It should be appreciated that the various instructional messages may also be communicated via other devices in addition to or in lieu of the display monitor 32. For example, the instructional messages may be generated with a voice generating device (not shown) or an audible tone generating device (not shown).

The data input device 34 is coupled to the processing unit 26 through a data communication line 49. The data input device 34 may include one or more of a known keypad or a touch pad. In addition, the processing unit 26 is coupled to the printer 36 via a data communication line 47. The printer 36 may be used to print a receipt at the end of a given checkout procedure. Moreover, the card reader 30 is coupled to the processing unit through a data communication line 45. The card reader 30 may include a known credit and/or debit card reader, or a smart card reader.

The processing unit 26 includes network interface circuitry (not shown) which conventionally permits the self-service checkout terminal 10 to communicate with the network 25 such as a LAN or WAN through a wired connection 51. The processing unit 26 communicates with the network 25 during the checkout procedure in order to obtain information such as pricing information on an item being scanned or weighed, and also to verify user credit approval when appropriate. The network interface circuitry associated with the self-service checkout terminal 10 may include a known Ethernet expansion card, and the wired connection 51 may include a known twisted-pair communication line. Alternatively, the network interface circuitry may support wireless communications with the network 25.

The processing unit 26 communicates with the memory device 27 via a data communication line 53. The memory device 27 is provided to maintain an electronic transaction table which includes a record of the product information associated with each item that is scanned, weighed, or otherwise entered during the user's use of the self-service checkout terminal 10. For example, if the user scans a can of soup, the description of the soup and the pricing information associated therewith is recorded in the transaction table in the memory device 27. Similarly, if the user weighs a watermelon with the product scale 12 and then enters a product lookup code associated with watermelon via the data input device 34, product information associated with the watermelon is recorded in the transaction table. Moreover, if a user entered a coupon or voucher, the information associated therewith would also be recorded in the transaction table.

It should therefore be appreciated that the sum of each of the items recorded in the transaction table (1) minus any reductions (e.g. coupons), and (2) plus any applicable taxes is the amount that the user pays for his or her transaction. Moreover, data stored in the transaction table is printed out on the printer 36 thereby generating a receipt for the user at the end of his or her transaction.

The memory device 27 is also provided to maintain a number of stored weight values associated with execution of the security software application 22. For example, during execution of the security software application 22, it is necessary to store a previous-stable-weight value in the memory device 27. In particular, in order to detect when items have been placed into or removed from the post-scan area 17, the processing unit 26 determines if the measured (and filtered) weight value detected by the post-scan scale 20 increases (in the case of item placement into the post-scan area 17) or decreases (in the case of item removal from the post-scan area 17). In order to determine such an increase or decrease, the processing unit 26 must have a baseline weight value to detect changes therefrom. Such a baseline weight value, herein referred to as a "previous-stable-weight value", is indicative of the last detected weight value by the post-scan scale 20 that was deemed valid by the filtering routine 48. Hence, if the current weight value detected by the post-scan scale 20 is greater than the previous-stable-weight value (after having been analyzed by the filtering routine 48), the processing unit 26 concludes that an item (or items) has been placed in the post-scan area 17. Conversely, if the current weight value detected by the post-scan scale 20 is less than the previous-stable-weight value (after having been analyzed by the filtering routine 48), the processing unit 26 concludes that an item (or items) has been removed from the post-scan area 17.

The memory device 27 further maintains a scale history table. The scale history table tracks measured weight values output by the post-scan scale 20. In particular, the scale history table tracks measured weight values output by the post-scan scale 20 when the measured weight values output by the post-scan scale 20 differ from the previous-stable-weight value. As shall be discussed in more detail below, monitoring such changes in measured weight values provides filtered or valid, stable weight values for use by the security software application 22 thereby enhancing security associated with operation of the self-service checkout terminal 10.

In operation, during a user's checkout transaction, the processing unit 26 monitors output form the post-scan scale 20 in order to determine if the measured weight values generated by the post-scan scale 20 are within a predetermined tolerance range, such as 0.02 pounds, of the previous-stable-weight value thereby indicating that no items have been placed in or removed from the post-scan area 17. For example, assume that the previous-stable-weight value (i.e. the total weight value of all of the items positioned in the post-scan area 17) is 12.34 pounds and that the predetermined tolerance range is 0.02 pounds. In addition, assume that the processing unit 26 determines that the current measured weight values output from the post-scan scale 20 are contained in the weight history table shown in TABLE 1. In such a situation, the processing unit 26 would not execute the filtering routine 48 since none of the measured weight values from the post-scan scale 20 are outside of the predetermined tolerance range (0.02 pounds) of the previous-stable-weight value (12.34 pounds).

TABLE 1

| Measurement Number ($W_x$) | $W_1$ | $W_2$ | $W_3$ | $W_4$ | $W_5$ | $W_6$ | $W_7$ | $W_8$ | $W_9$ | $W_{10}$ |
|---|---|---|---|---|---|---|---|---|---|---|
| Measured Weight (lbs.) | 12.34 | 12.33 | 12.33 | 12.36 | 12.35 | 12.32 | 12.34 | 12.34 | 12.35 | 12.36 |

However, if one or more measured weight values is outside of the predetermined tolerance range (e.g. 0.02 pounds), the processing unit 26 executes the filtering routine 48 in order to determine if the measured weight values are indicative of a valid, stable weight. For example, assume as before that the previous-stable-weight value (i.e. the total weight value of all of the items positioned in the post-scan area 17) is 12.34 pounds and that the predetermined tolerance range is 0.02 pounds. In addition, assume that the processing unit 26 determines that the current measured weight values output from the post-scan scale 20 are contained in the weight history table shown in TABLE 2. In such a situation, the processing unit 26 would execute the filtering routine 48 since at least one of the measured weight values from the post-scan scale 20 (i.e. $W_2$ and $W_4$) is outside of the predetermined tolerance range (0.02 pounds) of the previous-stable-weight value (12.34 pounds). However, the processing unit 26 would disregard the measured weight values listed in TABLE 2 since subsequent to a measured weight value being outside of the predetermined tolerance range (i.e. $W_2$ and $W_4$), a number of measured weight values are back within the predetermined tolerance range (i.e. $W_5$–$W_{10}$). It should be appreciated that such a situation in which measured weight values are first outside of the predetermined tolerance range, but then return to within the tolerance range may be caused by environmental conditions such as when the self-service checkout terminal 10 is bumped or otherwise jarred.

In addition, assume that the processing unit 26 determines that the current measured weight values output from the post-scan scale 20 are contained in the weight history table shown in TABLE 3. In such a situation, the processing unit 26 would execute the filtering routine 48 since at least one of the measured weight values from the post-scan scale 20 (in this case all of the current measured weight values) is outside of the predetermined tolerance range (0.02 pounds) of the previous-stable-weight value (12.34 pounds). In addition, the measured weight values would be categorized as light weight values since the first measured weight value is within 0.30 pounds of the previous-stable-weight value (12.34 pounds).

Once categorized, the processing unit 26 determines if a predetermined number of consecutive measured weight values meet the following requirements: (1) each of the current measured weight values must be within a predetermined measurement range of one another, (2) each of the current measured weight values must be obtained by the post-scan scale 20 within a predetermined time of one another, and (3) all of the current measured weight values must be taken within a predetermined overall time period. If any of the current measured weight values do not meet all of the three above-listed requirements, all of the current measured weight values are disregarded and a new sample is taken. For example, the processing unit 26 determines if ten (10) consecutive current measured weight values meet the following requirements: (1) each of the ten consecutive current

TABLE 2

| Measurement Number ($W_x$) | $W_1$ | $W_2$ | $W_3$ | $W_4$ | $W_5$ | $W_6$ | $W_7$ | $W_8$ | $W_9$ | $W_{10}$ |
|---|---|---|---|---|---|---|---|---|---|---|
| Measured Weight (lbs.) | 12.34 | 12.37 | 12.33 | 12.31 | 12.35 | 12.32 | 12.34 | 12.34 | 12.35 | 12.36 |

In a situation where each of the measured weight values is outside of the predetermined tolerance range, the filtering routine 44 groups the measured weight values into three categories. In particular, if the first measured weight value is within 0.30 pounds of the previous-stable-weight value, the filtering routine 48 categorizes the measured weight values as "light weight values". If the first measured weight value is between 0.30–2.00 pounds of the previous-stable-weight value, the filtering routine 48 categorizes the measured weight values as "medium weight values". Finally, if the first measured weight value is more than 2.00 pounds greater than or less than the previous-stable-weight value, the filtering routine 48 categorizes the measured weight values as "heavy/liquid weight values".

The filtering routine 48 filters each of the weight categories differently so as to arrive at a valid, stable weight value for presentation to the security software application 22 in a timely manner so as to account for environmental conditions and scale performance characteristics. For example, assume as before that the previous-stable-weight value stored in the memory device 27 (i.e. the total weight value of all of the measured weight values must be within 0.02 pounds of one another, (2) each of the ten consecutive current measured weight values must be obtained within 150 milliseconds of one another, and (3) all ten of the consecutive current measured weight values must be taken within one second. If each of the three above-listed requirements are met, the processing unit 26 averages the ten current measured weight values in the scale history table and thereafter replaces the existing previous-stable-weight value stored in the memory device 27 with the average of the measured weight values.

For example, assume that the measured weight values shown in TABLE 3 meet the three above-listed requirements, the processing unit 26 would replace the previous-stable-weight value (12.34 pounds) with the average of the measured weights in the weight history table shown in TABLE 3 (12.15 pounds). It should be appreciated that such a change in the previous-stable-weight value is interpreted by the security software application 22 as being indicative of one or more items being removed from the post-scan area 17.

TABLE 3

| Measurement Number ($W_x$) | $W_1$ | $W_2$ | $W_3$ | $W_4$ | $W_5$ | $W_6$ | $W_7$ | $W_8$ | $W_9$ | $W_{10}$ |
|---|---|---|---|---|---|---|---|---|---|---|
| Measured Weight (lbs.) | 12.14 | 12.16 | 12.15 | 12.16 | 12.14 | 12.16 | 12.15 | 12.16 | 12.15 | 12.14 | items positioned in the post-scan area 17) is 12.34 pounds and that the predetermined tolerance range is 0.02 pounds.

The filtering routine 48, when executed by the processing unit 26, analyzes measured weight values categorized as "medium weight values" in a similar manner as it does measured weight values categorized as light weight values. For example, assume as before that the previous-stable-weight value stored in the memory device 27 (i.e. the total weight value of all of the items positioned in the post-scan area 17) is 12.34 pounds and that the predetermined tolerance range is 0.02 pounds. In addition, assume that the processing unit 26 determines that the current measured weight values output from the post-scan scale 20 are contained in the weight history table shown in TABLE 4. In such a situation, the processing unit 26 would execute the filtering routine 48 since the first measured weight value from the post-scan scale 20 (in this case all of the current measured weight values) is outside of the predetermined tolerance range (0.02 pounds) of the previous-stable-weight value (12.34 pounds). In addition, the measured weight values would be categorized as medium weight values since each of the measured weight values is between 0.30 and 2.0 pounds of the previous-stable-weight value (12.34 pounds).

As with light weight values, in the case of medium weight values, the processing unit 26 determines if a predetermined number of consecutive measured weight values meet the following requirements: (1) each of the current measured weight values must be within a predetermined measurement range of one another, (2) each of the current measured weight values must be obtained by the post-scan scale 20 within a predetermined time of one another, and (3) all of the current measured weight values must be taken within a predetermined overall time period. If any of the current measured weight values do not meet all of the three above-listed requirements, all of the current measured weight values are disregarded and a new sample is taken. For example, in the case of medium weight values, the processing unit 26, when executing the filtering routine 48 determines if three (3) consecutive current measured weight values meet the following requirements: (1) each of the three consecutive current measured weight values must be within 0.04 pounds of one another, (2) each of the three consecutive current measured weight values must be obtained within 700 milliseconds of one another, and (3) all three of the consecutive current measured weight values must be taken within one second. As described, in the case of medium weight values, a fewer number of current measured weight values (e.g. three) may be utilized provided each of the measured weight values meets the three above-listed requirements. Hence, in the case of medium weight values, if the all three of the consecutive current measured weight values meet the three above-listed requirements, the processing unit 26 averages the current measured weight values in the scale history table and thereafter replaces the existing previous-stable-weight value stored in the memory device 27 with the average of the current measured weight values.

For example, assume that the consecutive measured weight values shown in TABLE 4 meet the three above-listed requirements, the processing unit 26 would replace the previous-stable-weight value (12.34 pounds) with the average of the measured weights in the weight history table shown in TABLE 4 (13.58 pounds). It should be appreciated that such a change in the previous-stable-weight value is interpreted by the security software application 22 as being indicative of one or more items being placed in the post-scan area 17.

TABLE 4

| Measurement Number ($W_x$) | $W_1$ | $W_2$ | $W_3$ |
|---|---|---|---|
| Measured Weight (lbs.) | 13.54 | 13.58 | 13.61 |

In the case of "heavy/liquid weight values", the processing unit 26, when executing the filtering routine 48, first determines if the weight values are indicative of a heavy non-liquid item or items being placed in the post-scan area 17. For example, assume as before that the previous-stable-weight value stored in the memory device 27 and therefore utilized by the security software application 22 (i.e. the total weight value of all of the items positioned in the post-scan area 17) is 12.34 pounds and that the predetermined tolerance range is 0.02 pounds. In addition, assume that the processing unit 26 determines that the current measured weight values output from the post-scan scale 20 are contained in the weight history table shown in TABLE 5. In such a situation, the processing unit 26 would execute the filtering routine 48 since the first measured weight value from the post-scan scale 20 (in this case all of the current measured weight values) is outside of the predetermined tolerance range (0.02 pounds) of the previous-stable-weight value (12.34 pounds). In addition, the current measured weight values would be categorized as heavy/liquid weight values since the first measured weight value is more than 2.00 pounds greater than or less than the previous-stable-weight value (12.34 pounds).

Once categorized, the processing unit 26 determines if a predetermined number of current measured weight values are identical to one another. For example, the processing unit 26 determines if five (5) consecutive current measured weight values are identical to one another. If so, the processing unit 26 replaces the existing previous-stable-weight value stored in the memory device 27 with the identical current measured weight value.

For example, in the case of the current measured weight values shown in TABLE 5, the processing unit 26 would replace the previous-stable-weight value (12.34 pounds) with the identical current measured weight value in the weight history table shown in TABLE 5 (16.47 pounds). It should be appreciated that such a change in the previous-stable-weight value is interpreted by the security software application 22 as being indicative of one or more items being placed in the post-scan area 17.

TABLE 5

| Measurement Number ($W_x$) | $W_1$ | $W_2$ | $W_3$ | $W_4$ | $W_5$ |
|---|---|---|---|---|---|
| Measured Weight (lbs.) | 16.47 | 16.47 | 16.47 | 16.47 | 16.47 |

In the case of liquid weight values or large, non-liquid weight values which are "settling" on the post-scan scale 20, varying or cyclic measured weight values are typically registered and therefore output by the post-scan scale 20. Such varying measured weight values are typically more than 2.00 pounds greater than the previous-stable-weight value. For example, assume as before that the previous-stable-weight value stored in the memory device 27 (i.e. the total weight value of all of the items positioned in the post-scan area 17) is 12.34 pounds and that the predetermined tolerance range is 0.02 pounds. In addition, assume that the processing unit 26 determines that the current measured weight values output from the post-scan scale 20 are contained in the weight history table shown in TABLE 6. In such a situation, the processing unit 26 would execute the filtering routine 48 since at least one of the measured weight values from the post-scan scale 20 (in this case all of the current measured weight values) is outside of the predetermined tolerance range (0.02 pounds) of the previous-stable-weight value (12.34 pounds). In addition, the current measured weight values would be categorized as heavy/liquid weight values since the first measured weight value is more than 2.00 pounds greater than the previous-stable-weight value (12.34 pounds).

Once categorized, the processing unit 26 determines if a predetermined number of "cycles" exists within the measured weight values. A "cycle" is herein intended to mean where the measured weight values transition from a relatively high measured weight value to a relatively low measured weight value which is followed by a relatively high measured weight value and so forth. Measured weight values between the high and the low values are ignored. Hence, as shown in TABLE 6, a first cycle is defined between measurements $W_2$–$W_4$, a second cycle is defined by measurements $W_5$–$W_7$, a third cycle is defined by measurements $W_8$–$W_{10}$, a fourth cycle is defined by measurements $W_{11}$–$W_{13}$, a fifth cycle is defined by measurements $W_{14}$–$W_{16}$, and a sixth cycle is defined by measurements $W_{17}$–$W_{19}$. Once, for example, four cycles are defined within a predetermined period of time (e.g. one second), the high weight values and the low weight values may be averaged in order to determined the stable weight value of the liquid item placed in the post-scan area 17. Moreover, preferably the first two cycles (outside of the four required cycles) are ignored in order to allow the post-scan scale 20 to stabilize prior to filtering of the weight values output therefrom. Hence, in TABLE 6, if the first two cycles are ignored, the average of the high and low values associated with the remaining cycles (as the scale weight fluctuates around the actual weight of the item) replaces the existing previous-stable-weight value stored in the memory device 27. For example, in the case of TABLE 6, the processing unit 26 would replace the previous-stable-weight value (12.34 pounds) with the average of the four cycles $W_8$–$W_{10}$, $W_{11}$–$W_{13}$, $W_{14}$–$W_{16}$, and $W_{17}$–$W_{19}$ (15.09 pounds) in the memory device 27. It should be appreciated that such a change in the previous-stable-weight value is interpreted by the security software application 22 as being indicative of one or more items being added to the post-scan area 17.

Figure 5:
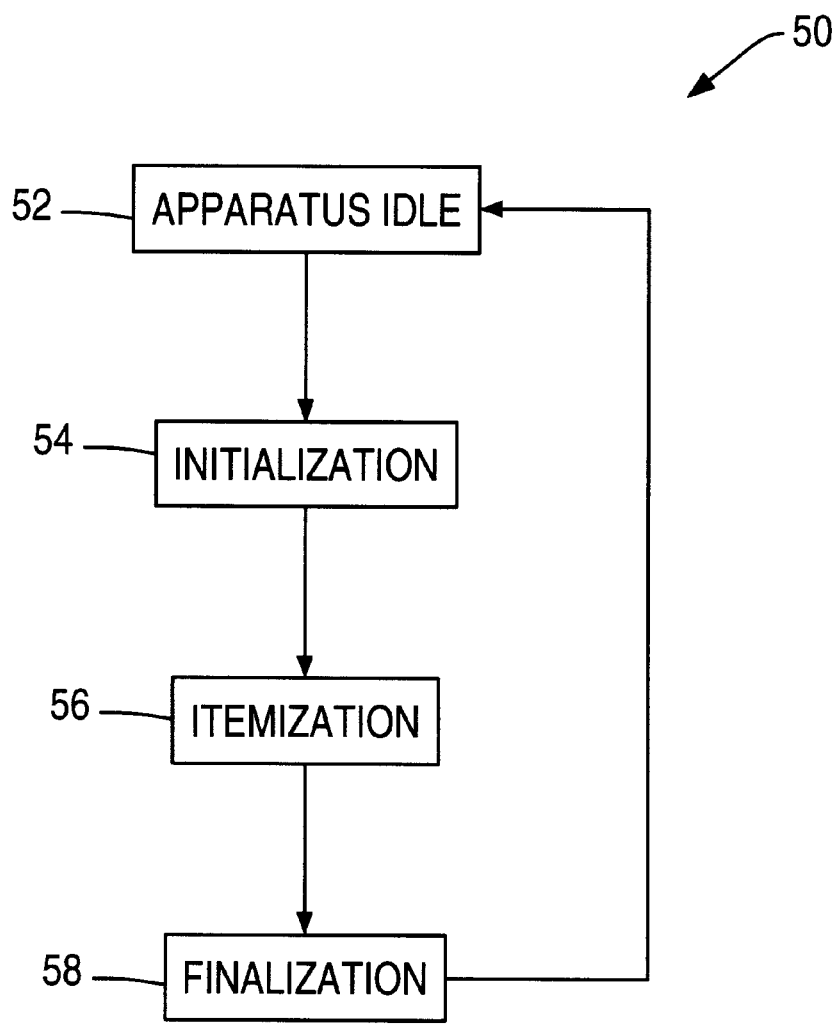
FIG. 5 is a flowchart which sets forth a general procedure for checking out items for purchase with the self-service checkout terminal of FIG. 1.

Referring now to FIG. 5, there is shown a flowchart which sets forth a general procedure 50 for checking out items through the self-service checkout terminal 10. When a user arrives at the self-service checkout terminal 10, the self-service checkout terminal 10 is in an idle state (step 52). An initialization step 54 is executed prior to checking out items for purchase. In particular, one or more initialization instructions are displayed on the display monitor 32 which instruct the user to (1) touch a particular area of the display monitor 32 or push a particular button on the data input device 34 in order to select a desired method of payment, and/or (2) identify himself or herself by inserting a shopping card, debit card, credit card, or smart card into the card reader 30.

At the completion of the initialization step 54, the routine 50 advances to an itemization step 56 where the user enters individual items for purchase by scanning the items across the scanner 14. Moreover, in step 56 the user enters items, such as produce items or the like, by weighing with the items with the product scale 12, and thereafter entering a product lookup code associated with the item via either the data input device 34 or by touching a particular area of the display monitor 32. Further, in step 56 the user may enter an item by manually entering the product code associated with the item via use of the data input device 34. Such manual entry of an item may be necessary for items which would otherwise be entered via the scanner 14 if the bar code printed on the item is not readable by the scanner 14. It may also be necessary during step 56 for the user to void entry of an item from the checkout procedure via use of the scanner 14 or the data input device 34. It should be appreciated that during the itemization step 56, items are typically placed in and removed from the post-scan area 17 of the self-service checkout terminal 10. Hence, during the itemization step 56, the processing unit 26 executes the filtering routine 48 in order to provide valid, stable weights for presentation to the security software application 22.

Moreover, it should be appreciated that the self-service checkout terminal 10 may be configured such that the routine 50 allows experienced users of the self-service checkout terminal 10 to bypass the initialization step 52 thereby advancing directly to the itemization step 56. In such a configuration, the experienced user would begin the transaction by scanning or otherwise entering his or her first item for purchase.

At the completion of the itemization step 56, the routine 50 advances to a finalization step 58 in which (1) a grocery receipt is printed by the printer 36, and (2) payment is tendered by either inserting currency into a cash acceptor (not shown), charging a credit card account, or decreasing a

TABLE 6

| Measurement Number ($W_x$) | $W_1$ | $W_2$ | $W_3$ | $W_4$ | $W_5$ | $W_6$ | $W_7$ | $W_8$ | $W_9$ | $W_{10}$ |
|---|---|---|---|---|---|---|---|---|---|---|
| Measured Weight (lbs.) | 15.14 | 17.56 High value | 13.15 | 12.16 Low value | 17.34 High value | 12.58 | 12.34 Low value | 17.16 High value | 15.15 | 12.54 Low value |
| | | ← Cycle #1 → | | | ← Cycle #2 → | | | ← Cycle #3 → | | |

| Measurement Number ($W_x$) | $W_{11}$ | $W_{12}$ | $W_{13}$ | $W_{14}$ | $W_{15}$ | $W_{16}$ | $W_{17}$ | $W_{18}$ | $W_{19}$ | $W_{20}$ |
|---|---|---|---|---|---|---|---|---|---|---|
| Measured Weight (lbs.) | 17.04 High value | 15.16 | 13.15 Low value | 16.86 High value | 15.54 | 13.54 Low value | 16.75 High value | 15.16 | 13.64 Low value | 16.60 |
| | ← Cycle #4 → | | | ← Cycle #5 → | | | ← Cycle #6 → | | | | value amount stored on a smart card or debit card via the card reader 30. It should be appreciated that in the case of when a user inserts currency into the cash acceptor, the self-service checkout terminal 10 may provide change via a currency dispenser (not shown) and a coin dispenser (not shown). After completion of the finalization step 58, the routine 50 returns to step 52 in which the self-service checkout terminal 10 remains in the idle condition until a subsequent user initiates a checkout procedure.

Figure 6A:
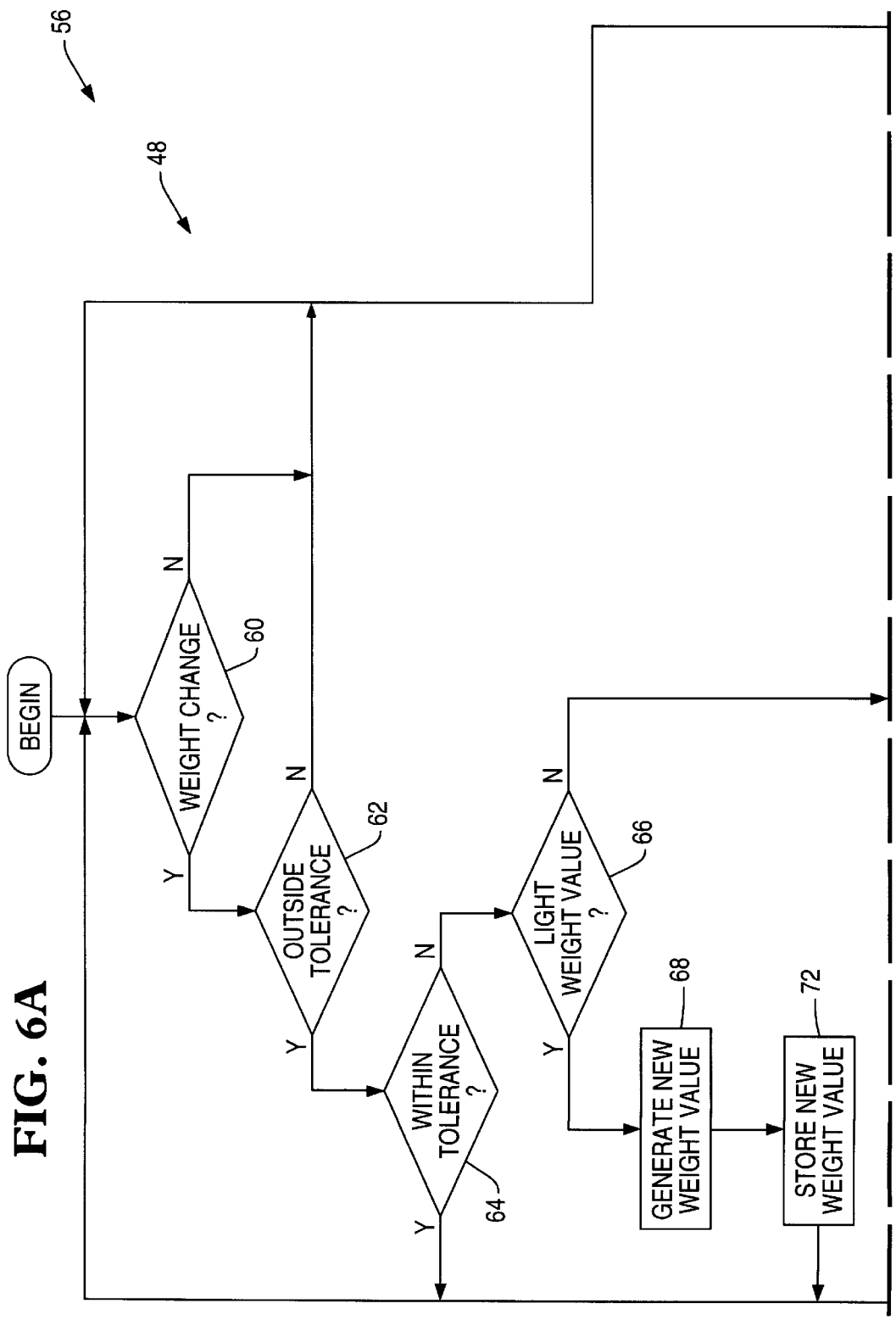
FIG. 6 is a flowchart which sets forth a portion of the itemization step of the general procedure of FIG. 5 in greater detail.

Referring now to FIG. 6, there is shown a flowchart setting forth the itemization step 56 in greater detail. As alluded to above, the processing unit 26 executes the filtering routine 48 during the itemization step 56 in order to monitor placement of items in and removal of items from the post-scan area 17. The filtering routine 48 begins with step 60 in which the processing unit 26 determines the current measured weight values being output from the post-scan scale 20. In particular, the processing unit 26 monitors the data communication line 37 in order to determine if the current measured weight values being output from the post-scan scale 20 differ from the previous-stable-weight value stored in the memory device 27. If the current measured weight values being output from the post-scan scale 20 differ from the previous-stable-weight value stored in the memory device 27, the routine 48 advances to step 62. If the current measured weight values being output from the post-scan scale 20 are the same as the previous-stable-weight value stored in the memory device 27, the routine 48 loops back to monitor additional measured weight values output from the post-scan scale 20.

In step 62, the processing unit 26 determines if the current measured weight values are within a predetermined tolerance range of the previous-stable-weight value. For example, in step 62, the processing unit 26 determines if the current measured weight values are within 0.02 pounds of the previous-stable-weight value. If all of the current measured weight values are not within the predetermined tolerance range of the previous-stable-weight value, a weight change control signal is generated and the routine 48 advances to step 64. If all of the current measured weight values are within the predetermined tolerance range of the previous-stable-weight value, a no change control signal is generated and the routine 48 loops back to step 60 to monitor additional measured weight values.

In step 64, the processing unit 26 determines if subsequent measured weight values are within a predetermined tolerance range of the previous-stable-weight value. For example, in step 64, the processing unit 26 determines if any subsequent measured weight values are within 0.02 pounds of the previous-stable-weight value stored in memory device 27. If the subsequent measured weight values are not within the predetermined tolerance range of the previous-stable-weight value, a weight change control signal is generated and the routine 48 advances to step 66. If any of the current measured weight values are within the predetermined tolerance range of the previous-stable-weight value, a no change control signal is generated and the processing unit 26 concludes that the measured weight values which were outside of the predetermined tolerance range were due to environmental conditions such as when a user bumps into the self-service checkout terminal 10. Hence, the processing unit disregards the current measured weight values and the routine 48 loops back to step 60 to monitor additional measured weight values.

In step 66, the processing unit 26 determines if the current measured weight values output from the post-scan scale 20 are "light weight values" as described above. If the first current measured weight value output from the post-scan scale 20 is a light weight value, the routine 48 advances to step 68. If the current measured weight values output from the post-scan scale 20 are not light weight values, the routine advances to step 70.

In step 68, the processing unit 26 determines a new stable weight value based on the current measured weight values output from the post-scan scale 20. In particular, as described above, when the processing unit 26 obtains a predetermined number of measured weight values which meet certain predetermined requirements associated with light weight values, the processing unit 26 averages the light weight values so as to generate a valid, stable weight value. Thereafter, the routine 48 advances to step 72.

In step 72, the processing unit 26 replaces the weight value stored as the previous-weight-change value in the memory device 27 with the average of the light weight values determined in step 68. It should be appreciated that the newly stored average weight value becomes the previous-stable-weight value for future reference. In addition, the newly stored average weight value is presented to the security software application 22 for use thereof. The routine then loops back to step 60 to monitor additional measured weight values.

Returning now to step 66, if the first measured weight value output from the post-scan scale 20 is not a light weight value, the routine advances to step 70. In step 70, the processing unit 26 determines if the first measured weight value output from the post-scan scale 20 is a "medium weight value" as described above. If the measured weight values output from the post-scan scale 20 are medium weight values, the routine 48 advances to step 74. If the measured weight values output from the post-scan scale 20 are not medium weight values, the routine advances to step 76.

In step 74, the processing unit 26 determines a new stable weight value based on the current measured weight values output from the post-scan scale 20. In particular, as described above, when the processing unit 26 obtains a predetermined number of measured weight values which meet certain predetermined requirements associated with medium weight values, the processing unit 26 averages the medium weight values so as to generate a valid, stable weight value. Thereafter, the routine 48 advances to step 78.

In step 78, the processing unit 26 replaces the weight value stored as the previous-weight-change value in the memory device 27 with the average of the medium weight values determined in step 74. It should be appreciated that the newly stored average weight value becomes the previous-stable-weight value for future reference. In addition, the newly stored average weight value is presented to the security software application 22 for use thereof. The routine then loops back to step 60 to monitor additional measured weight values.

Returning now to step 70, if the measured weight values output from the post-scan scale 20 are not medium weight values, the routine advances to step 76. In step 76, the processing unit 26 determines if the current measured weight values output from the post-scan scale 20 are "heavy weight values" as described above. If the measured weight values output from the post-scan scale 20 are heavy weight values, the routine 48 advances to step 80. If the measured weight values output from the post-scan scale 20 are not heavy weight values, the routine advances to step 82.

In step 80, the processing unit 26 determines a new stable weight value based on the current measured weight values output from the post-scan scale 20. In particular, as described above, when the processing unit 26 obtains a predetermined number of measured weight values which are identical with one another so as to meet certain predetermined requirements associated with heavy weight values, the processing unit 26 utilizes the identical heavy weight values so as to generate a valid, stable weight value. Thereafter, the routine 48 advances to step 84.

In step 84, the processing unit 26 replaces the weight value stored as the previous-weight-change value in the memory device 27 with the identical heavy weight value determined in step 80. It should be appreciated that the newly stored weight value becomes the previous-stable-weight value for future reference. In addition, the newly stored weight value is presented to the security software application 22 for use thereof. The routine then loops back to step 60 to monitor additional measured weight values.

Returning now to step 76, if the measured weight values output from the post-scan scale 20 are not heavy weight values, the routine advances to step 82. In step 82, the processing unit 26 determines if the measured weight values output from the post-scan scale 20 are "liquid weight values" as described above. If the measured weight values output from the post-scan scale 20 are liquid weight values, the routine 48 advances to step 86. If the measured weight values output from the post-scan scale 20 are not liquid weight values, the processing unit 26 concludes that an error has occurred. Thereafter, the routine 48 may loop back to step 60 to monitor additional measured weight values, or operation of the self-service checkout terminal 10 may be suspended until the error is reconciled.

In step 86, the processing unit 26 determines a new stable weight value based on the current measured weight values output from the post-scan scale 20. In particular, as described above, when the processing unit 26 obtains a predetermined number of measured weight values which meet certain predetermined requirements associated with liquid weight values, the processing unit 26 averages the high and low weight values of four cycles so as to generate a valid, stable weight value. Thereafter, the routine 48 advances to step 90.

In step 90, the processing unit 26 replaces the weight value stored as the previous-weight-change value in the memory device 27 with the average of the liquid weight values determined in step 86. It should be appreciated that the newly stored average weight value becomes the previous-stable-weight value for future reference. In addition, the newly stored average weight value is presented to the security software application 22 for use thereof. The routine then loops back to step 60 to monitor additional measured weight values.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

For example, the output from the pre-scan shelf scale 16 and cart/basket scale 18 may be filtered in a similar manner as the output from the post-scan scale 20 to fit the needs of a particular self-service checkout terminal 10.

What is claimed is:

1. A method of operating a retail terminal having a weight scale associated therewith, wherein said retail terminal executes a security software application so as to provide security to said retail terminal during operation thereof, said method comprising the steps of:

determining a current weight value associated with output from said weight scale;

comparing said current weight value to a previous-stable-weight value and generating a weight change control signal if said current weight value is not within a predetermined tolerance range of said previous-stable-weight value;

replacing said previous-stable-weight value with said current weight value in a memory device associated with said retail terminal in response to generation of said weight change control signal; and utilizing said current weight value during execution of said security software application in response to generation of said weight change control signal;

wherein (i) said weight scale is positioned so as to detect weight of a number of items contained in a grocery container, and (ii) said determining step includes the step of determining said current weight value associated with said output from said weight scale based on said weight of said number of items contained in said grocery container.

2. The method of claim 1, further comprising the steps of:

generating a no change control signal if said current weight value is within said predetermined tolerance range of said previous-stable-weight value; and disregarding said current weight value in response to generation of said no change control signal.

3. The method of claim 2, further comprising the step of:

utilizing said previous-stable-weight value during execution of said security software application in response to generation of said no change control signal.

4. The method of claim 1, wherein:

said weight scale outputs a number of varying weight values when an item containing a liquid is placed on said weight scale; and said determining step includes the step of determining said current weight value by averaging said number of varying weight values.

5. A retail terminal, comprising:

a weight scale; and a processing unit electrically coupled to said weight scale; and a memory device electrically coupled to said processing unit, wherein said memory device has stored therein a plurality of instructions which, when executed by said processing unit, causes said processing unit to:

(a) determine a current weight value associated with output from said weight scale, (b) compare said current weight value to a previous-stable-weight value stored in said memory device and generate a weight change control signal if said current weight value is not within a predetermined tolerance range of said previous-stable-weight value, (c) replace said previous-stable-weight value with said current weight value in said memory device in response to generation of said weight change control signal, (d) execute a security software application so as to provide security to said retail terminal during operation thereof, and (e) utilize said current weight value during execution of said security software application in response to generation of said weight change control signal.

6. The retail terminal of claim 5, wherein said plurality of instructions, when executed by said processing unit, further causes said processing unit to:
   (a) generate a no change control signal if said current weight value is within said predetermined tolerance range of said previous-stable-weight value, and
   (b) disregard said current weight value in response to generation of said no change control signal.

7. The retail terminal of claim 5, wherein said plurality of instructions, when executed by said processing unit, further causes said processing unit to utilize said previous-stable-weight value during execution of said security software application in response to generation of said no change control signal.

8. The retail terminal of claim 5, wherein:
   said weight scale outputs a number of varying weight values when an item containing a liquid is placed on said weight scale, and
   said plurality of instructions, when executed by said processing unit, further causes said processing unit to determine said current weight value by averaging said number of varying weight values.

9. The retail terminal of claim 5, wherein:
   said weight scale is positioned so as to detect weight of a number of items contained in a grocery container, and
   said plurality of instructions, when executed by said processing unit, further causes said processing unit to determine said current weight value associated with said output from said weight scale based on said weight of said number of items contained in said grocery container.

10. A method of operating a retail terminal having a weight scale associated therewith, comprising the steps of:
    executing a security software application so as to provide security to said retail terminal during operation thereof;
    determining a current weight value associated with output from said weight scale;
    comparing said current weight value to a previous-stable-weight value and generating a weight change control signal if said current weight value is not within a predetermined tolerance range of said previous-stable-weight value; and
    utilizing said current weight value during execution of said security software application in response to generation of said weight change control signal.

11. The method of claim 10, further comprising the steps of:
    generating a no change control signal if said current weight value is within said predetermined tolerance range of said previous-stable-weight value; and
    disregarding said current weight value in response to generation of said no change control signal.

12. The method of claim 11, further comprising the step of:
    utilizing said previous-stable-weight value during execution of said security software application in response to generation of said no change control signal.

13. The method of claim 10, wherein:
    said weight scale outputs a number of varying weight values when an item containing a liquid is placed on said weight scale; and
    said determining step includes the step of determining said current weight value by averaging said number of varying item weight values.

14. The method of claim 10, wherein:
    said weight scale is positioned so as to detect weight of a number of items contained in a grocery container, and
    said determining step includes the step of determining said current weight value associated with said output from said weight scale based on said weight of said number of items contained in said grocery container.

\* \* \* \* \*